"Adjust H" Position

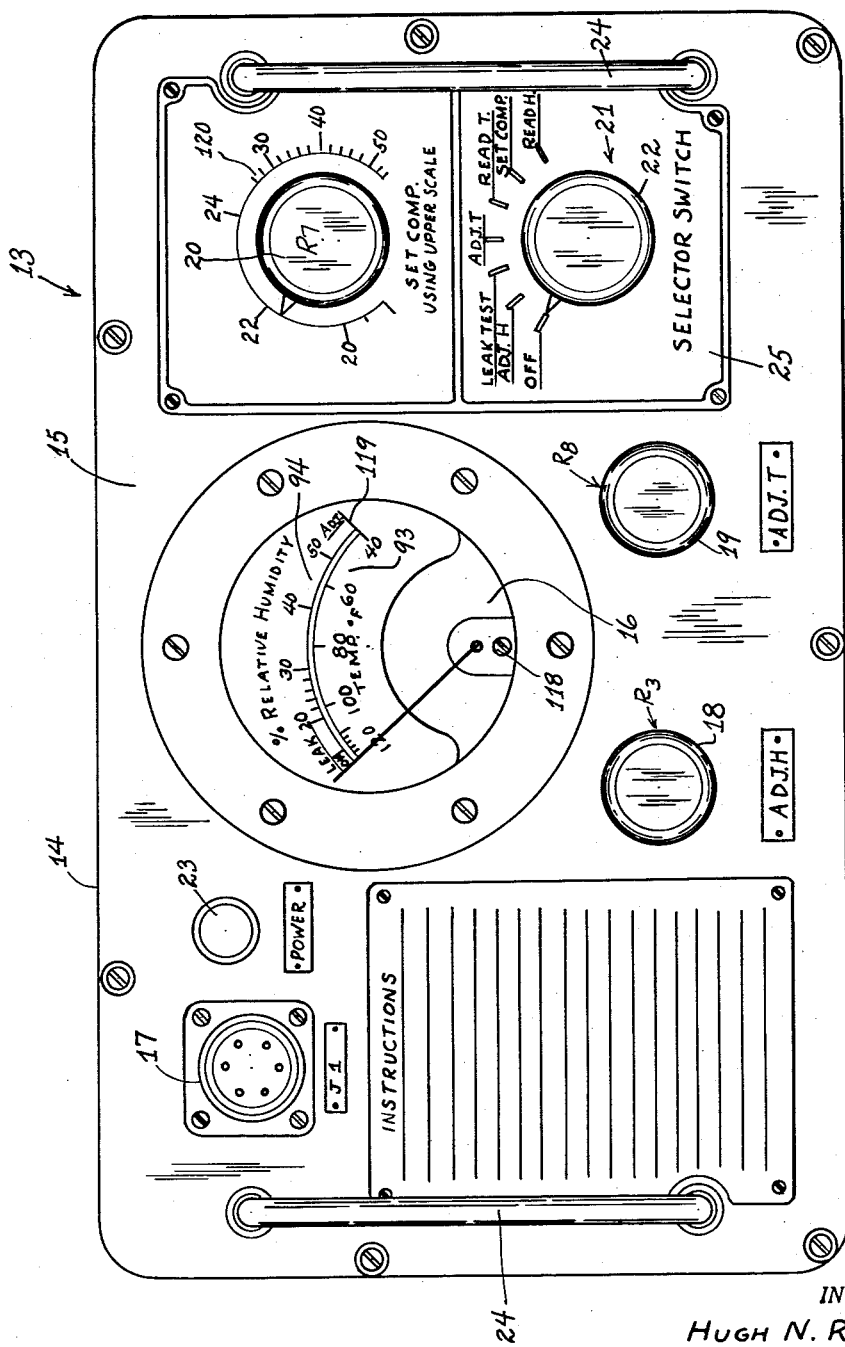

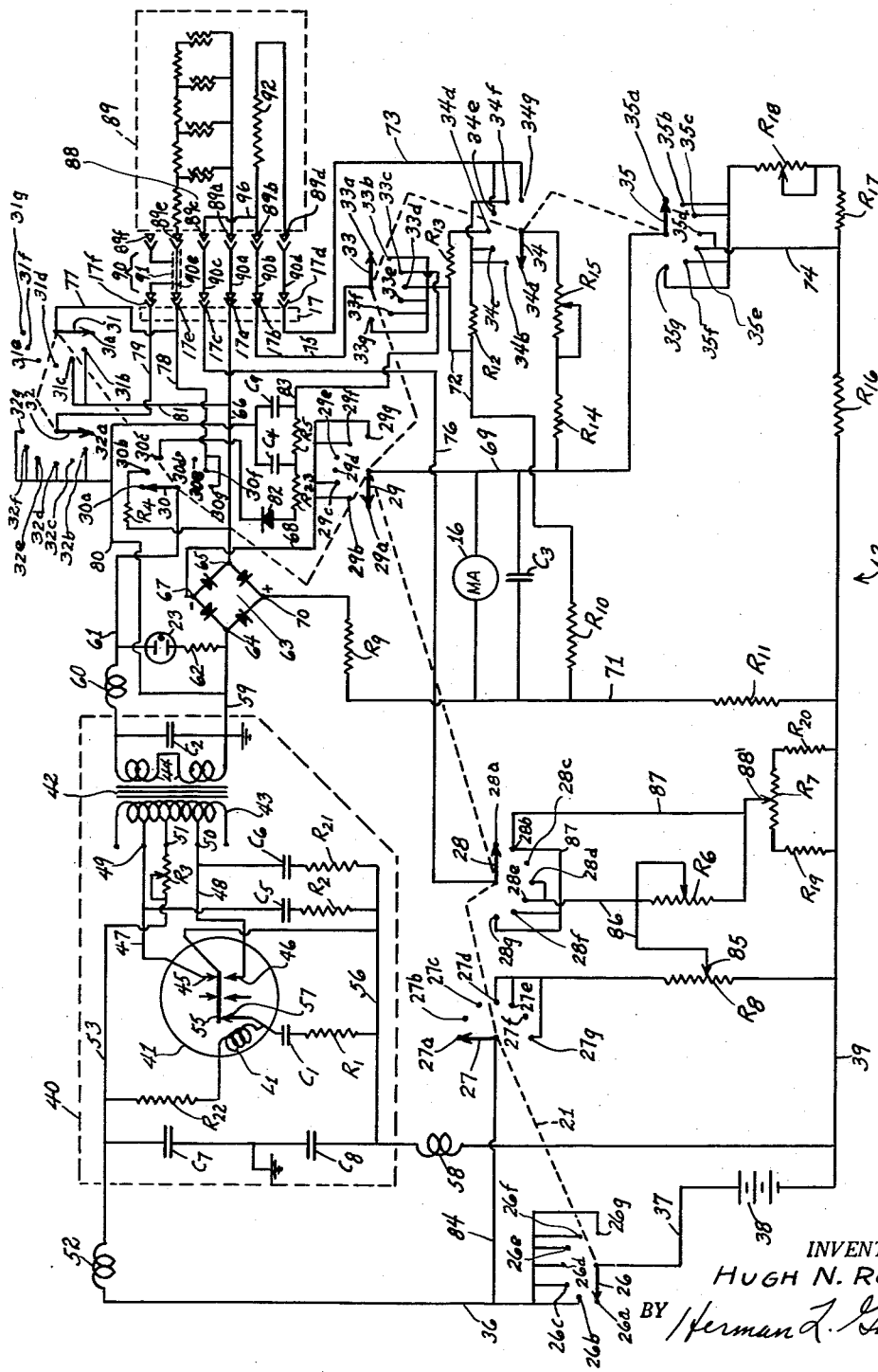

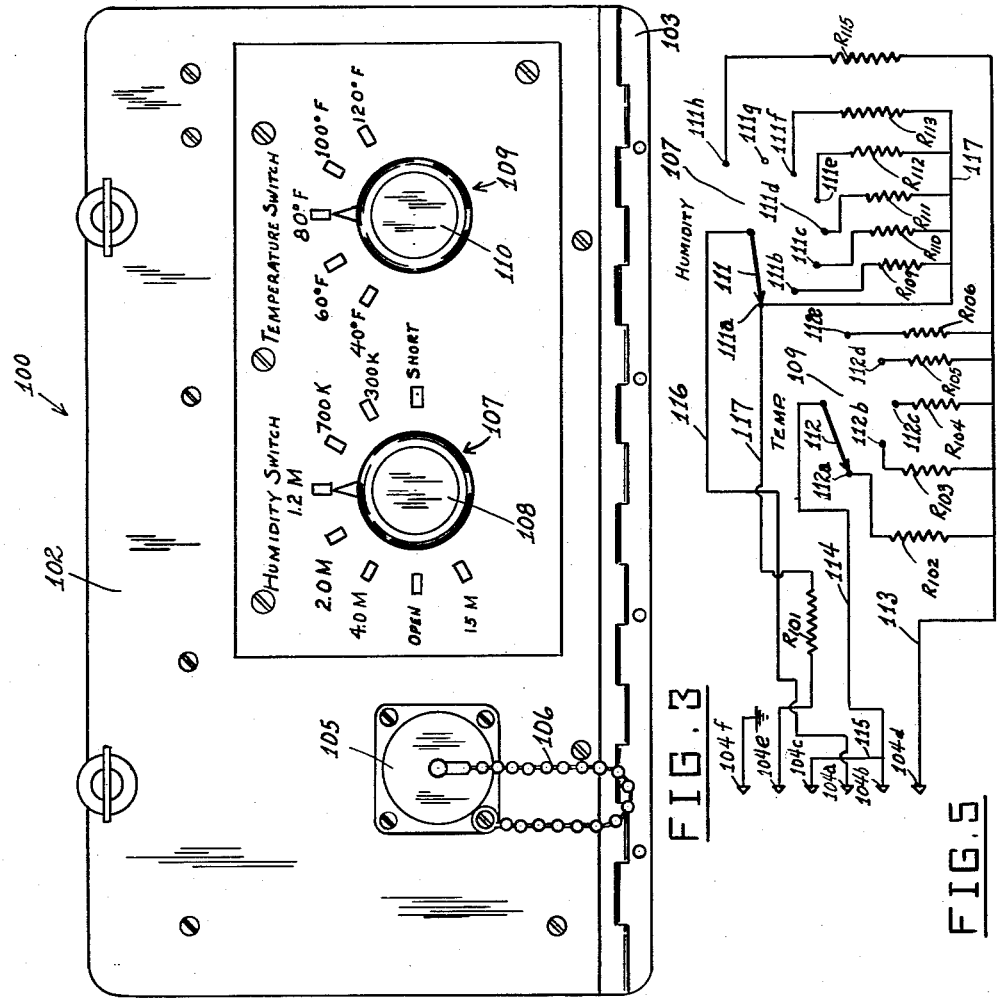
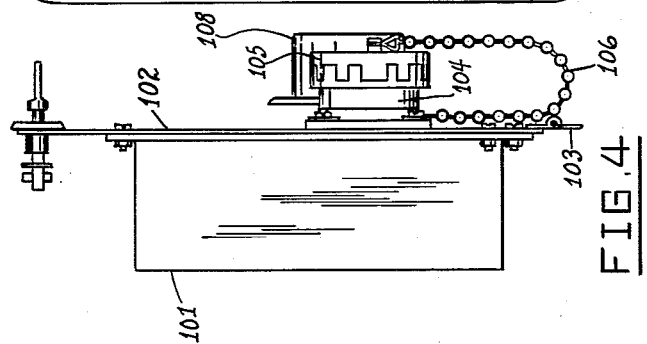

"Set Comp." Position

"Leak Test" Position

"Adjust T" Position

"Read H" Position

"Read T" Position

INVENTOR.
HUGH N. ROSS
BY Herman L. Gordon
ATTORNEY

United States Patent Office

2,966,061
Patented Dec. 27, 1960

---

2,966,061

RELATIVE HUMIDITY MEASURING APPARATUS

Hugh N. Ross, Silver Spring, Md., assignor to American Instrument Company, Inc., Silver Spring, Md.

Filed Dec. 6, 1956, Ser. No. 626,774

7 Claims. (Cl. 73—336.5)

This invention relates to temperature and humidity measuring devices, and more particularly to temperature and humidity indicating systems wherein an electric circuit is employed containing temperature and humidity sensing elements of the current-modifying type.

A main object of the invention is to provide a novel and improved temperature and humidity measuring instrument which is relatively simple in construction, which provides a direct indication of temperature, and which provides a directly calibrated indication of relative humidity, corrected for ambient temperature.

A further object of the invention is to provide an improved temperature and humidity indicating apparatus which employs relatively simple and inexpensive components, which is completely portable, and wherein the indicators and sensing elements may be readily replaced as required.

A still further object of the invention is to provide an improved temperature and humidity indicating apparatus which includes means for preventing a false indication when no sensing element is connected to the apparatus.

A still further object of the invention is to provide an improved temperature and humidity indicating apparatus which includes means for testing the connecting cable thereof, the sensing element thereof, and the connectors thereof to determine that no unacceptable leakage exists.

A still further object of the invention is to provide an improved temperature and humidity measuring and indicating apparatus which is reliable in operation, provides accurate indications, and which can be easily operated by persons with relatively little skill or training.

Further objects and advantages of the invention will become apparent from the following description and claims, and from the accompanying drawings, wherein:

Figure 1 is a front elevational view of the main panel of a temperature and humidity indicating apparatus constructed in accordance with the present invention.

Figure 2 is a schematic diagram illustrating the electrical connections of the apparatus of Figure 1.

Figure 3 is a front elevational view of a calibration device employed in the apparatus of the present invention.

Figure 4 is a side elevational view of the calibration device of Figure 3.

Figure 5 is a schematic diagram illustrating the electrical connections of the calibration device of Figures 3 and 4.

Figure 6:
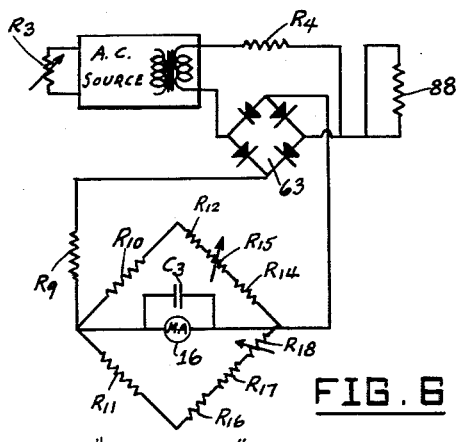
Figure 6 is a simplified wiring diagram showing the active electrical circuit of the apparatus of Figures 1 and 2 when the selector switch thereof is in its "Adjust H" position.

The electrical circuit of the device of the present invention, shown schematically in Figure 2, is basically similar to but is an improvement over the circuit employed in U.S. Patent No. 2,684,592 to R. E. Hadady, issued July 27, 1954. One of the improvements is the placement of one of the internal adjustment elements on the front panel with a calibrated scale, allowing the instrument to be used for a narrower range of humidity and to still maintain good control of the temperature compensation means.

The instrument is arranged so that the temperature battery adjustment cannot be made unless a sensing element is connected to the instrument. This is accomplished by wiring the temperature power to the sensing element by one wire, through a jumper in the sensing element, and through a return wire to the instrument.

Since the resistance of the humidity sensing element employed in apparatus of this type is very high (up to 15 megohms or more), it is important to avoid leakage between wires or terminals. Also it is desirable to be able to employ long cables between the instrument and its sensing element, with acceptable accuracy. The circuits to and in the sensing element are in two sections, namely, temperature and humidity. A leakage test circuit is provided which applies a D.C. voltage between the temperature wiring and the humidity wiring, and measures any leakage current which may flow. A.C. voltage is not used because the variable capacitance of different length cables would make the current values meaningless.

Referring to the drawings, the apparatus comprises a main unit 13 which is contained in a suitable housing 14 provided with a front panel 15. Mounted on the panel 15 are the indicating meter 16, the female connector receptable 17, for a conventional six-prong male plug, the "Adjust H" rheostat $R_3$ having the control knob 18, the "Adjust T" potentiometer $R_8$ having the control knob 19, the "Set Compensation" rheostat $R_7$ having the control knob 20, the 7-position 10-wafer selector switch 21 having the control knob 22, and the neon lamp 23. The panel 15 is provided with a pair of handles 24, 24 secured to the opposite end portions thereof to facilitate handling of main unit 13.

The selector switch 21 has the seven positions indicated on a panel plate 25, as shown, namely, "Off," "Adj. H," "Leak Test," "Adj. T," "Read T," "Set Comp." and "Read H."

Referring to Figure 2, the ten poles of selector switch 21 are designated at 26 to 35, respectively. Associated with the pole 26 are the seven contacts $26a$ to $26g$, respectively. Associated with pole 27 are the contacts $27a$ to 27g. Associated with the pole 28 are the contacts 28a to 28g. Associated with the pole 29 are the contacts 29a to 29g. Associated with the pole 30 are the contacts 30a to 30g. Associated with the pole 31 are the contacts 31a to 31g. Associated with the pole 32 are the contacts 32a to 32g. Associated with the pole 33 are the contacts 33a to 33g. Associated with the pole 34 are the contacts 34a to 34g. Associated with the pole 35 are the contacts 35a to 35g.

Contacts 26b to 26g are connected to a common wire 36. Pole 26 is connected by a wire 37 to the positive terminal of a battery 38. The negative terminal of said battery is connected to a wire 39.

Designated at 40 is a D.C.-A.C. converter including a conventional removable vibrator 41 and a step-up transformer 42 having a primary 43 and a secondary 44. The output contacts 45 and 46 of the vibrator are connected by suitable wires 47 and 48 to respective input terminals 49 and 50 of primary 43. The primary center tap 51 is connected to wire 36 through the rheostat $R_3$, a wire 53 and a radio frequency choke coil 52. The vibrator armature 55 is connected to a conductor 56. Respective high-pass filter networks $C_5$—$R_2$ and $C_6$—$R_{21}$ are connected between wires 47, 48 and conductor 56. A high-pass filter network $C_1$—$R_1$ is connected between the lower vibrator contact 57 and conductor 56. Wire 53 is connected to lower vibrator contact 57 through the driving coil $L_1$ of the vibrator and a dropping resistor $R_{22}$.

By-pass condensers $C_7$ and $C_8$ are connected between wires 53, 56 and the chassis ground, as shown. The battery negative wire 39 is connected to wire 56 through a radio frequency choke coil 58.

One terminal of secondary 44 is connected to a grounded wire 59. The other secondary terminal is connected through a radio frequency choke coil 60 to a wire 61, which, in turn, is connected to switch pole 30. A by-pass condenser $C_2$ is connected across the terminals of secondary 44.

The neon lamp 23 is connected between wires 61 and 59 through a 200,000 ohm series resistor 62, which may be included in the socket of said lamp.

Designated at 63 is a full wave rectifier having one A.C. terminal 64 connected to wire 59 and its other A.C. terminal 65 connected to a wire 66, which is in turn, connected to a contact element 17a of the female socket 17.

The negative output terminal 67 of rectifier 63 is connected to a wire 68, which is in turn, connected to the contacts 29b, 29c, 29f and 29g associated with the switch pole 29. Pole 29 is connected by a wire 69 to the switch pole 35.

The positive output terminal 70 of rectifier 63 is connected through a resistor $R_9$ to a wire 71, which is in turn, connected through a resistor $R_{11}$ to the wire 39. The indicating milliammeter 16 is connected across the wires 69 and 71, and also connected across said wires is a filter condenser $C_3$.

Designated at $R_{10}$ is a resistor having one terminal thereof connected to wire 71 and the other terminal thereof connected by a wire 72 to the contact 33d associated with switch pole 33. A resistor $R_{13}$ is connected between contact 33d and contact 34d associated with switch pole 34. A resistor $R_{12}$ is connected between wire 72 and the contacts 34b, 34c and 34f associated with pole 34. Connected in series between wire 69 and pole 34 are a resistor $R_{14}$ and a rheostat $R_{15}$.

The contacts 34e and 34g associated with pole 34 are connected by a wire 73 to the contact element 17d of female plug receptacle 17.

Contacts 35d and 35e are connected to a wire 74, which in turn, is connected through a resistor $R_{16}$ to the wire 39. Contacts 35b, 35c, 35f and 35g are connected through a rheostat $R_{18}$ and a resistor $R_{17}$ to the wire 74.

The contact 17b of the six-element female receptacle 17 is connected by a wire 75 to the switch pole 33. Contact 17c of said receptacle 17 is connected by a wire 76 to the switch pole 28. Contact 17e is connected by a wire 77 to switch pole 31. The contacts 30f and 30g associated with switch pole 30 are connected to a wire 78, which is in turn, connected to contact 17e.

Contact 17f of receptacle 17 is connected by a wire 79 to switch pole 32. Contacts 32b, 32d, 32e, 32f and 32g are connected to a wire 80, which in turn, is connected to the grounded wire 59.

Contacts 31b and 31c associated with pole 31 are connected by a wire 81 to wire 66.

Contact 30b associated with switch pole 30 is connected through a resistor $R_4$ to wire 66. Contact 30c is connected through a rectifier 82 and filter resistors $R_{23}$ and $R_5$ to a wire 83, which in turn, is connected to contact 33c associated with pole 33.

Contacts 33b, 33e, 33f and 33g are electrically connected to contact 33d and hence, to wire 72.

A pair of filter condensers $C_4$ and $C_9$ are connected between the respective terminals of resistor $R_5$ and the grounded wire 80.

Wire 36 is connected by a wire 84 to switch pole 27. Contacts 27d, 27e and 27g are connected through the winding of potentiometer $R_8$ to the negative wire 39.

The adjustable contact 85 of potentiometer $R_8$ is connected by a wire 86 to contacts 28e and 28d associated with switch pole 28. Contacts 28b, 28f and 28g are connected together by a common wire 87.

The terminals of the resistance winding of potentiometer $R_7$ are respectively connected to the negative wire 39 through resistors $R_{19}$ and $R_{20}$. The adjustable contact 88' of potentiometer $R_7$ is connected to the wire 87 and to wire 86 through the rheostat $R_6$.

A temperature and humidity sensing unit 89 is employed with the main unit 13 of the apparatus, the sensing unit being of any suitable type, for example, being of the plug-in, wide-range type disclosed in patent application Serial No. 585,059, "Wide Range Electrical Humidity-Sensing Unit," filed by Carlton E. Ohlheiser May 15, 1956, now Patent No. 2,870,306, issued January 20, 1959. This unit comprises a humidity-sensitive network, designated generally at 88 and connected to the terminal prongs 89a and 89e, and a temperature-sensitive resistance 92, for example, a thermistor, connected to the terminal prongs 89b and 89d. The unit 89 has a terminal prong 89c which is connected to terminal 89b by a jumper wire 96, and has a terminal prong 89f.

The unit 89 is connected to the main unit 13 by a six-wire cable 90 which may be of substantial length. Cable 90 comprises the insulated conductors 90a to 90e, which are connected at their ends to the terminals of suitable male and female cable connectors provided on cable 90 to electrically connect prong 89a to terminal 17a, prong 89b to terminal 17b, prong 89c to terminal 17c, prong 89d to terminal 17d, and prong 89e to terminal 17e. Conductor 90e is provided with a shield 91 which is connected at its opposite ends to terminals of the cable respectively engageable with the apparatus terminal 17f and the sensing unit prong 89f, as shown.

Figure 9:
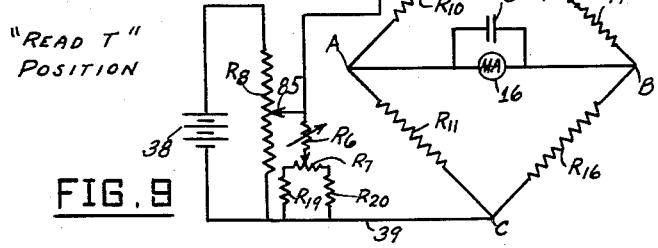
Figure 9 is a diagram showing the active electrical circuit of the apparatus of Figures 1 and 2 when the selector switch thereof is in its "Read T" position.

In the "Read T" position of selector switch 21, a Wheatstone bridge circuit configuration is provided, as shown in Figure 9, wherein the temperature-sensitive resistor 92 is included in an arm of the bridge containing resistor $R_{14}$ and rheostat $R_{15}$, the other arms of the bridge comprising the respective resistors $R_{10}$, $R_{11}$ and $R_{16}$, as shown. Battery voltage is applied to the bridge at the terminals D and C, and the milliammeter 16 is connected across the terminals A and B. Milliammeter 16 is provided with a temperature scale 93 which will give a reading of ambient temperature in accordance with the resistance value of temperature-sensitive resistor 92 after proper calibration of the bridge in a manner presently to be described.

Figure 11:
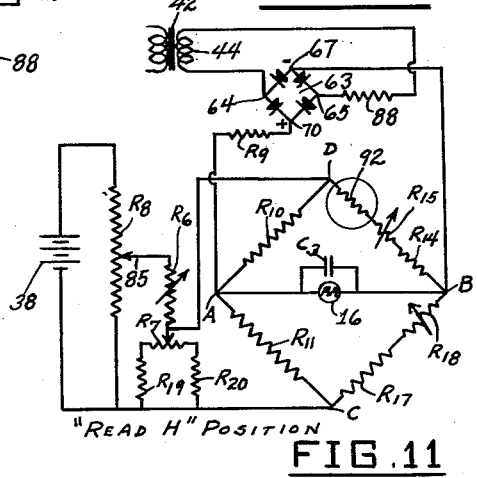
Figure 11 is a diagram showing the active electrical circuit of the apparatus when the selector switch thereof is in its "Read H" position.

In the "Read H" position of selector switch 21, a circuit configuration such as that shown in Figure 11 is provided, wherein the Wheatstone bridge includes the rheostat $R_{18}$ and resistor $R_{17}$ in the arm C—B instead of resistor $R_{16}$, as in Figure 9. The positive terminal 70 of the rectifier 63 is connected through resistor $R_9$ to the bridge terminal A and the negative terminal 67 of said rectifier is connected to the bridge terminal B. The humidity-sensitive network 88 (shown in Figure 11 as a single resistor) is connected in series with the secondary 44 of transformer 42 and terminals 65 and 64 of rectifier 63. Milliammeter 16 is provided with a relative humidity scale 94 which will give a direct reading of percent relative humidity after proper calibration of the circuit, as will be presently described.

The calibration device employed in the apparatus is designated generally at 100 and is illustrated in Figures 3, 4 and 5. The calibration device 100 comprises a suitable housing 101 provided with a front panel 102. A hinged leaf 103 is provided at one longitudinal margin of panel 102, so that the calibration device may be hingedly connected to the interior of a cover employed with the main unit of the apparatus, or to any other convenient portion of the main unit.

The front panel 102 is provided with a six-prong male plug 104 identical with the six-pronged male plug of the sensing unit 89 and having the prongs 104a to 104f spaced in the same manner as the prongs 89a to 89f of unit 89. A protective screw cap 105 is provided on panel plug 104 to protect same when the calibration device is not in use. Cap 105 is connected to panel 102 by a chain 106.

Mounted on panel 102 is an 8-position "humidity" selector switch 107 having a control knob 108, and also mounted on said panel is a 5-position "temperature" selector switch 109 having a control knob 110. Switch 107 has the pole 111 and the associated contacts 111a to 111h. Switch 109 has the pole 112 and the associated contacts 112a to 112e.

Connected to prong 104d is a wire 113. Connected between the contacts 112a to 112e and the wire 113 are the respective temperature calibrating resistors $R_{102}$ to $R_{106}$, as shown in Figure 3. Pole 112 is connected by a wire 114 to prong 104b.

A leak test resistor $R_{115}$ of relatively high value, such as 15 megohms, is connected between wire 113 and contact 111h.

Prong 104c is connected to prong 104b by a jumper wire 115.

Pole 111 is connected to prong 104a by a wire 116. Contact 111a is connected to prong 104e through a resistor $R_{101}$ by a wire 117. Connected between contacts 111b to 111f and wire 117 are the respective humidity calibrating resistors $R_{109}$ to $R_{113}$, as shown. The resistors $R_{109}$ to $R_{113}$ are of different resistance values and are employed to simulate different humidity sensing element conditions (humidities) for a given sensing element.

Prong 104f is grounded to the chassis of the calibration device.

The jumper wire 115 corresponds to the jumper wire 96 of the sensing unit 89, so that the wires 75 and 76 of main unit 13 are disconnected unless either the sensing unit 89 or the calibration device 100 is connected to the main unit, thereby preventing the delivery of battery current to the indicator 16, and preventing false indications, unless unit 89 or the device 100 is connected to receptacle 17.

The resistors $R_{102}$ to $R_{106}$ are of suitable values to simulate different temperature conditions of the temperature sensing element 92.

The internal adjustments of the main unit 13 of the apparatus may be made by performing the following steps:

(1) The zero position of the needle of the milliammeter 16 is first checked, and if the needle is not at its zero position it is adjusted to zero by means of the meter needle adjusting screw, shown at 118 in Figure 1.

(2) The battery 38 is then connected to the instrument.

(3) The calibration device 100 is then connected to the main unit by means of the cable 90 and the temperature switch 109 is set at 120° F.

(4) The selector switch 21 is then set to the "Read T" position, providing the circuit configuration of Figure 9, except that the 120° F. resistor $R_{102}$ is in the bridge circuit in place of thermistor 92 of Figure 9.

(5) The "Adj. T" knob 19 is then rotated to its stop position in a direction to provide maximum resistance of potentiometer $R_8$ between the potentiometer tap 85 and the negative wire 39.

(6) Rheostat $R_{15}$ is then adjusted until the meter needle indicates 120° F. on scale 93.

(7) Selector switch 21 is then set at the "Read H" position, and the vibrator 41 is removed. This provides the circuit configuration of Figure 11, except that resistor $R_{102}$ is in the bridge circuit in place of thermistor 92, and there is no A.C. in the circuit of transformer secondary 44.

(8) Temperature switch 109 is then set at its 80° F. position, inserting resistor $R_{104}$ in place of resistor $R_{102}$.

(9) Rheostat $R_{18}$ is then adjusted until the meter needle indicates 120° F. on scale 93.

(10) Vibrator 41 is then replaced.

(11) Selector switch 21 is then set at its "Adj. H" position and the "Adj. H" knob 18 (for rheostat $R_3$) is rotated until the meter needle is at its full scale position, namely, at the line 119 on the meter face. This adjusts rheostat $R_3$ to provide required vibrator input current under the prevailing battery condition and under the conditions of the power supply components,

(12) Selector switch 21 is then set at its "Adj. T" position and the "Adj. T" knob 19 is adjusted until the meter needle is at the full scale line 119.

(13) Selector switch 21 is then set to its "Read H" position. Humidity switch 107 is then set to its "300 K" position, inserting resistor $R_{109}$ in place of the resistor 88 in the circuit configuration of Figure 11. (The 80° F. resistor $R_{104}$ is in the circuit in place of thermistor 92.) The "Set Comp." knob 20 (controlling potentiometer $R_7$) is then adjusted to a position on its scale 120, found by earlier test, such that the battery voltage applied to the temperature bridge by the voltage divider network (including $R_8$, $R_6$, $R_7$, $R_{19}$ and $R_{20}$) is a maximum.

Figure 12:
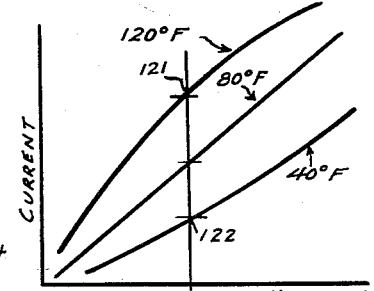
Figure 12 is a diagram illustrating typical humidity response curves of a humidity sensing element at different temperatures and showing the need for applying a temperature correction factor to the response of the sensing element in order to obtain an accurate relative humidity reading.

(14) Rheostat $R_6$ is then adjusted in cooperation with temperature switch 109 to a position such that when switch 109 is successively switched from its 40° F. position to its 120° position, and vice versa, the difference between the two indications on the scale 94 of meter 16 is a specified value, for example, 14%, which depends on the working range of the sensing unit 89 to be employed. This introduces part of the required temperature correction factor for the selected sensing unit. Figure 12 illustrates different humidity response curves of a given sensing unit at different temperatures, namely, 120° F., 80° F. and 40° F., showing the necessity for the temperature correction. Thus, the two indications on the meter, above mentioned, correspond, for example, to the points 121 and 122 on the response curves in Figure 12. Since the response curves are not parallel, the specified acceptable value of the difference between the indications will depend on the selected working range of humidity.

The above steps complete the internal adjustments of the instrument.

In using the instrument in the field, the following steps are performed in externally adjusting the instrument for use and for checking for leakage:

(1) Selector switch 21 is placed in "Adj. H" position, providing the circuit configuration of Figure 6. The "Adj. H" knob 18 (controlling rheostat $R_3$) is rotated until the meter needle rests at the "Adj." line 119. This adjusts the instrument for battery condition and for the condition of the power supply components.

Figure 7:
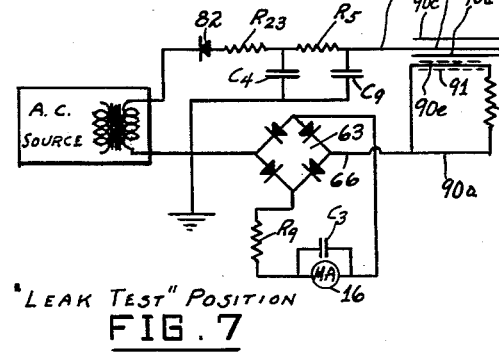
Figure 7 is a diagram showing the active electrical circuit of the apparatus of Figures 1 and 2 when the selector switch thereof is in its "Leak Test" position.

(2) Selector switch 21 is placed in "Leak Test" position, providing the circuit configuration of Figure 7. This applies D.C. voltage directly between cable conductors 90b, 90c and cable conductors 90a and 90e, the rectifier 63 being polarized so that it acts merely as a low resistance for leak current. If leakage is not present or is negligible, the meter needle will be in the "O.K." leak area on scale 94.

Figure 8:
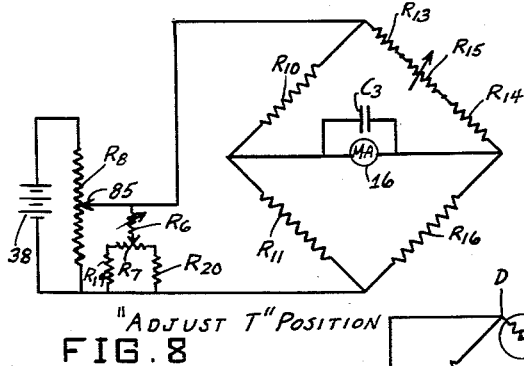
Figure 8 is a diagram showing the active electrical circuit of the apparatus of Figures 1 and 2 when the selector switch thereof is in its "Adjust T" position.

(3) Selector switch 21 is placed in the "Adj. T" position, giving the circuit configuration of Figure 8. The "Adj. T" knob 19 is rotated until the meter needle rests on the "Adj." line 119. This adjusts potentiometer $R_8$ for battery condition and for the condition of the power supply components. It also serves as a check for the presence of the sensing element 89 at the end of cable 90, because of the required jumper connection 96 in the sensing unit.

(4) Selector switch 21 is placed in the "Read T" position, providing the circuit configuration of Figure 9. This temperature reading may now be observed from scale 93.

Figure 10:
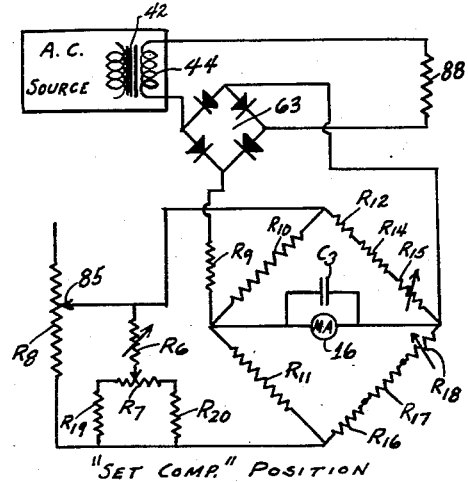
Figure 10 is a diagram showing the active electrical circuit of the apparatus of Figures 1 and 2 when the selector switch thereof is in its "Set Comp." position.

(5) Selector switch 21 is placed in the "Set Comp." position, giving the circuit configuration of Figure 10. The "Set Comp." knob 20 is then rotated to a position wherein its pointer indicates on its scale 120 the same value as the meter needle shows on scale 94. This adjustment of potentiometer $R_7$ introduces the required temperature correction factor in accordance with the working range of the sensing unit.

(6) Selector switch 21 is then placed in the "Read H" position, giving the circuit configuration of Figure 11. The actual relative humidity can be then observed directly from the meter scale 94.

If the relative humidity is too high to be read on scale 94, the meter needle will swing off scale in the direction of higher relative humidity, indicating the necessity of using a sensing unit of higher range.

The leak test function of the instrument may be checked whenever desired by connecting the calibration device 100 to the main unit and placing knob 108 in its "15 M" position. This connects the high resistance $R_{115}$ between the terminals 17a and 17d and introduces a known amount of leakage between the temperature and humidity detecting circuits. In the circuit of Figure 7, the resistor $R_{115}$ will be in series with one of the resistors $R_{102}$ to $R_{106}$ inserted in place of thermistor 92, so that an artificial leakage circuit will be provided between wire 75 and wire 66 comprising the series-connected resistor $R_{115}$ and said one of the resistors $R_{102}$ to $R_{106}$.

The "Set Comp." scale 12 represents the previously determined settings of the voltage divider potentiometer $R_7$ required to introduce the proper temperature correction factor for the working humidity range into the circuit of Figure 7.

In the circuit configuration of Figure 10, the meter 16 is in circuit with the alternating current source, the rectifier 63 and the humidity-sensing element 88; the voltage divider network comprising $R_8$, $R_6$, $R_7$, $R_{19}$ and $R_{20}$ is connected merely as a resistive load through the bridge resistors $R_{10}$, $R_{11}$ and $R_{12}$, $R_{14}$, $R_{15}$, $R_{18}$, $R_{17}$, $R_{16}$. The meter 16 will provide an uncompensated indication of humidity in accordance with the resistance of the humidity-sensing element 88.

As will be apparent from Figure 12, the amount of correction required (compensation for the non-parallelism of the other humidity characteristic curves with the 80° F. humidity characteristic curve) depends entirely on the working humidity range. The circuit configuration of Figure 10, in effect, locates the working humidity range and provides a practical indication on scale 94 of the required amount of temperature correction.

In a typical embodiment of the invention, the following circuit values were employed:

Resistors:

| | | |
|---|---|---|
| $R_1$ | ohms | 180 |
| $R_2$ | do | 180 |
| $R_3$ | ohms max | 50 |
| $R_4$ | ohms | 910,000 |
| $R_5$ | do | 330,000 |
| $R_6$ | ohms max | 10,000 |
| $R_7$ | ohms | 2,500 |
| $R_8$ | do | 1,000 |
| $R_9$ | do | 10,000 |
| $R_{10}$ | do | 10,000 |
| $R_{11}$ | do | 10,000 |
| $R_{12}$ | do | 12,230 |
| $R_{13}$ | do | 36,900 |
| $R_{14}$ | do | 3,000 |
| $R_{15}$ | ohms max | 5,000 |
| $R_{16}$ | ohms | 10,000 |
| $R_{17}$ | do | 5,100 |
| $R_{18}$ | ohms max | 5,000 |
| $R_{19}$ | ohms | 0 |
| $R_{20}$ | do | 1,000 |
| $R_{21}$ | do | 180 |
| $R_{22}$ | do | 10 |
| $R_{23}$ | do | 330,000 |
| $R_{101}$ | do | 910,000 |
| $R_{102}$ | do | 4,740 |
| $R_{103}$ | do | 7,500 |
| $R_{104}$ | do | 12,230 |
| $R_{105}$ | do | 20,800 |
| $R_{106}$ | do | 36,900 |
| $R_{109}$ | do | 300,000 |
| $R_{110}$ | do | 700,000 |
| $R_{111}$ | megohms | 1.2 |
| $R_{112}$ | do | 2.0 |
| $R_{113}$ | do | 4.0 |
| $R_{115}$ | do | 15.0 |

Condensers:

| | |
|---|---|
| $C_1$ | .01 mfd., 200 v. |
| $C_2$ | .015 mfd., 400 v. |
| $C_3$ | 100 mfd., 15 v. |
| $C_4$ | .01 mfd., 200 v. |
| $C_5$ | .01 mfd., 200 v. |
| $C_6$ | .01 mfd., 200 v. |
| $C_7$ | .47 mfd., 200 v. |
| $C_8$ | .47 mfd., 200 v. |
| $C_9$ | .01 mfd., 200 v. |

While a specific embodiment of an improved portable temperature and humidity measuring apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a relative humidity measuring apparatus, a temperature measuring circuit including a temperature sensing element and a meter, a first source of current, an adjustable voltage divider network interconnecting said source and measuring circuit and including a potentiometer having a manually variable control element and a scale associated therewith, a humidity-responsive circuit including a second source of current connected to said meter, a resistor, and means formed and arranged to at times simultaneously substitute said resistor for said temperature sensing element and disconnect said first source from the temperature measuring circuit, to cause the meter to provide indications substantially in accordance only with humidity, said scale being calibrated in accordance with the humidity indications and said potentiometer being formed and arranged to be manually adjusted to a point on its scale corresponding to the humidity indications of said meter, whereby the voltage from said first source to the temperature measuring circuit will be regulated in accordance with said humidity indications when the temperature measuring circuit is restored to its original condition by resubstituting said temperature sensing element and reconnecting said first source of current.

2. In a relative humidity measuring apparatus, a Wheatstone bridge including a temperature-responsive element and a meter, a first source of current, means including an adjustable voltage divider network connecting said source to said bridge and including a potentiometer having a manually variable control element and a scale associated therewith, a humidity-responsive circuit including a second source of current and a humidity-sensitive circuit element connected to said meter, a resistor, and means formed and arranged to at times simultaneously substitute said resistor for the temperature-responsive element and disconnect said first source from the Wheatstone bridge, to cause the meter to provide indications substantially in accordance only with humidity, said scale being calibrated in accordance with the humidity indications and said potentiometer being formed and arranged to be manually adjusted to a point on its scale corresponding to the humidity indications of said meter, whereby the voltage from said first source to the bridge will be regulated in accordance with said humidity indications when the bridge is restored to its original condition by resubstituting said temperature-responsive element and reconnecting said first source of current.

3. In a relative humidity measuring apparatus, a Wheatstone bridge including a temperature-sensitive resistor and a meter, a first source of current, an adjustable voltage divider network connecting said source to said bridge and being formed and arranged to actuate said meter in accordance with the temperature condition of said resistor, said network including a potentiometer having a manually variable control element and a scale associated therewith, a second current source, a humidity-sensitive resistance circuit, means connecting said second source and said humidity-sensitive resistance circuit in series to said meter, a fixed resistor, means formed and arranged to at times simultaneously substitute said fixed resistor for said temperature-sensitive resistor and to disconnect said first source from said voltage divider network, to cause the meter to provide indications substantially in accordance only with humidity, said scale being calibrated in accordance with the humidity indications and said potentiometer being formed and arranged to be manually adjusted to a point on its scale corresponding to the humidity indications of said meter, whereby the voltage from said first source to the bridge will be regulated in accordance with said humidity indications when the bridge is restored to its original condition by resubstituting said temperature-sensitive resistor and reconnecting said first source of current.

4. In a relative humidity measuring apparatus, a Wheatstone bridge including a temperature-sensitive resistor and a meter, a first source of current, a potentiometer, circuit means interconnecting said potentiometer between said source and said bridge and being formed and arranged to apply an adjusted voltage to said bridge from said source in accordance with the setting of said potentiometer, whereby to actuate said meter in accordance with the temperature condition of said resistor, said potentiometer having a manually variable control element and a scale associated therewith, a second current source, a humidity-sensitive resistance circuit, means connecting said second source and said humidity-sensitive resistance circuit in series to said meter, a fixed resistor, means formed and arranged to at times simultaneously substitute said fixed resistor for said temperature-sensitive resistor and to disconnect said first source from said potentiometer, to cause the meter to provide indications substantially in accordance only with humidity, said scale being calibrated in accordance with the humidity indications and said potentiometer being formed and arranged to be manually adjusted to a point on its scale corresponding to the humidity indications of said meter, whereby the voltage from said first source to the bridge will be regulated in accordance with said humidity indications when the bridge is restored to its original condition by resubstituting said temperature-sensitive resistor and reconnecting said first source of current.

5. In a relative humidity measuring apparatus, a sensing unit comprising a temperature-sensitive resistance and a humidity-sensitive resistance, an indicator unit comprising a Wheatstone bridge having a meter, a source of direct current, an adjustable voltage divider network, means connecting said network to said direct current source, means connecting said network to said bridge, said network including a potentiometer having a manually variable control element and a scale associated therewith, means connecting said temperature-sensitive resistance into an arm of said bridge, a converter connected to said direct current source and being formed and arranged to generate an alternating current, circuit means connecting the output of said converter to said humidity-sensitive resistance, rectifier means interconnecting said last-named circuit means and said meter and being formed and arranged to apply rectified current from the output of the converter and the humidity-sensitive resistance to the meter, a resistor, means formed and arranged to at times simultaneously substitute said resistor for said temperature-sensitive resistance and to disconnect the direct current source from the voltage divider network, whereby the meter will then provide indications substantially in accordance only with humidity, said scale being calibrated in accordance with the humidity indications and said potentiometer being formed and arranged to be manually adjusted to a point on its scale corresponding to the humidity indications of said meter, whereby the voltage from said direct current source to said bridge will be regulated in accordance with said humidity indications when the bridge is restored to its original condition by resubstituting said temperature-sensitive resistance for said resistor and reconnecting said direct current source to said voltage divider network.

6. In a relative humidity measuring apparatus, a sensing unit comprising a temperature-sensitive resistance and a humidity-sensitive resistance, an indicator unit comprising a Wheatstone bridge having a meter, a source of direct current, an adjustable voltage divider network, a multiple-conductor cable, a jumper conductor in said sensing unit, means connecting said temperature-sensitive resistance into an arm of said bridge through a first pair of conductors of said cable, a converter connected to said direct current source and being formed and arranged to generate an alternating current, means connecting the output of said converter to said humidity-sensitive resistance through a second pair of conductors of said cable, means connecting the meter in series with the output of the converter and the humidity-sensitive resistance and including a rectifier formed and arranged to rectify the current in the circuit of the humidity-sensitive resistance and to apply the rectified current to the meter, means connecting the voltage divider network to said direct current source, means connecting said network to the bridge through two of the conductors of said cable and said jumper conductor, said network including a potentiometer having a manually variable control element and a scale associated therewith, a resistor, means formed and arranged to at times simultaneously substitute said resistor for said temperature-sensitive resistance and to disconnect the direct current source from the voltage divider network, whereby the meter will then provide indications substantially in accordance only with humidity, said scale being calibrated in accordance with the humidity indications and said potentiometer being formed and arranged to be manually adjusted to a point on its scale corresponding to the humidity indications of said meter, whereby the voltage from said direct current source to said bridge will be regulated in accordance with said humidity indications when the bridge is restored to its original condition by resubstituting said temperature-sensitive resistance for said resistor and reconnecting said direct current source to said voltage divider network.

7. In a relative humidity measuring apparatus, a sensing unit comprising a temperature-sensitive resistance and a humidity-sensitive resistance, an indicator unit comprising a Wheatstone bridge having a meter, a source of direct current, an adjustable voltage divider network, a multiple-conductor cable, a jumper conductor in said sensing unit, means connecting said temperature-sensitive resistance into an arm of said bridge through a first pair of conductors of said cable, a converter connected to said direct current source and being formed and arranged to generate an alternating current, means connecting the output of said converter to said humidity-sensitive resistance through a second pair of conductors of said cable, means connecting the meter in series with the output of the converter and the humidity-sensitive resistance and including a rectifier formed and arranged to rectify the current in the circuit of the humidity-sensitive resistance and to apply the rectified current to the meter, means connecting the voltage divider network to said direct current source, means connecting said network to the bridge through two of the conductors of said cable and said jumper conductor, a resistor, means formed and arranged to at times substitute said resistor for said temperature-sensitive resistance and to disconnect the direct current source from the voltage divider network, whereby the meter will then provide an indication substantially in accordance only with humidity, means to adjust said network in accordance with the humidity indication and being formed and arranged to adjust the voltage applied to said bridge from said direct current source accordingly, a second rectifier, and means formed and arranged at other times to connect the output of the converter to the meter through said second rectifier and the leakage path between said first pair of conductors and said second pair of conductors of the cable.

References Cited in the file of this patent

UNITED STATES PATENTS

| | | |
|---|---|---|
| 2,514,106 | Thompson | July 4, 1950 |
| 2,684,592 | Hadady | July 27, 1954 |